United States Patent [19]

Masuda et al.

[11] Patent Number: 5,656,356
[45] Date of Patent: Aug. 12, 1997

[54] BIAXIALLY ORIENTED LAMINATED POLYESTER FILM

[75] Inventors: Shigeyoshi Masuda, Tokyo; Yoshimichi Hase; Masami Etchu, both of Sagamihara, all of Japan

[73] Assignee: Teijin Limited, Osaka, Japan

[21] Appl. No.: 370,493

[22] Filed: Jan. 9, 1995

[30] Foreign Application Priority Data

Jan. 11, 1994 [JP] Japan ..................... 6-001256

[51] Int. Cl.⁶ .................. B32B 27/36; B32B 27/18; B32B 5/16
[52] U.S. Cl. .................. 428/141; 428/215; 428/323; 428/336; 428/480; 428/694 SG; 428/910
[58] Field of Search .................. 428/141, 480, 428/910, 694 ST, 694 SL, 694 SG, 323, 213, 215, 336

[56] References Cited

U.S. PATENT DOCUMENTS

| | | | |
|---|---|---|---|
| 4,590,119 | 5/1986 | Kawakami et al. | 428/216 |
| 5,364,698 | 11/1994 | Kotani et al. | 428/323 |
| 5,366,783 | 11/1994 | Utsumi et al. | 428/141 |
| 5,374,467 | 12/1994 | Sato | 428/143 |
| 5,419,942 | 5/1995 | Masuda et al. | 428/141 |
| 5,431,976 | 7/1995 | Etchu et al. | 428/65.3 |

FOREIGN PATENT DOCUMENTS

| | | |
|---|---|---|
| 0522412 | 1/1993 | European Pat. Off. . |
| 0562486 | 9/1993 | European Pat. Off. . |
| 63-126723 | 5/1988 | Japan . |

OTHER PUBLICATIONS

Database WPI, Section Ch, Week 8525, Derwent Publications, Ltd., London, UK Abstract of Japanese Laid–Open Patent Publication No. 60–080125 (May 8, 1985).

*Primary Examiner*—Paul J. Thibodeau
*Assistant Examiner*—Vivian Chen
*Attorney, Agent, or Firm*—Sherman and Shalloway

[57] ABSTRACT

A biaxially oriented laminated polyester film comprises a polyester substrate layer (A) and a polyester surface layer (B) containing inert particles wherein the polyester surface layer (B) has a thickness of 0.2 to 3 μm with the thickness of the polyester surface layer (B) varying along the film width direction so that the surface layer (B) is thicker at the edges of the film and thinner at the center of the film. The thickness of the surface layer (B) also satisfies specified relationships based on surface layer thickness, birefringence, and orientation angle values at two different points along the film width direction in order to obtain a film whose surface layer (B) has a uniform surface roughness in the film width direction wherein the polyester surface layer (B) has a surface roughness Ra of 3 to 40 nm and a surface roughness Ra fluctuation ratio of 5% or less when measured along a distance of 500 mm in the film width direction. The laminated film can be slit and easily wound into pancake rolls.

2 Claims, No Drawings

BIAXIALLY ORIENTED LAMINATED POLYESTER FILM

BACKGROUND OF THE INVENTION

1. Field of the Invention

The present invention relates to a biaxially oriented laminated polyester film comprising a polyester substrate layer, a thin polyester surface layer laminated on one surface of the substrate layer and optionally a thin polyester surface layer laminated on the other surface of the substrate layer, and having uniform surface roughness, lubricity, abrasion resistance and scratch resistance in the width direction of the surface layer of the film.

2. Prior Art

A biaxially oriented polyester film has excellent properties and is therefore used in various fields of magnetic tapes, electric parts, photography, metallizing and packaging. Above all, a biaxially oriented polyester film has high strength and a high elastic modulus and is therefore widely used as a base film for magnetic recording media such as a video tape, an audio tape, a computer tape and a floppy disk.

In these fields, with growing demands for high-density recording and in compliance with a higher quality in recent years, a polyester film as a base film is strongly required to have a flat surface.

However, as the flatness of a film surface increases, there will arise such problems that in the usage of magnetic tape, for example, the film has an increased coefficient of friction and it is liable to fail in running or suffer scratching. Further, when a film having a flat surface is taken up in the form of a roll in the film production, the form of a roll is liable to be markedly poor, or it is difficult to take up the film in a wood rolled form.

Moreover, for improving the productivity of a film, it is required to increase the take-up rate and broaden the film width. However, the increase in the take-up rate and the broadening of the film width involve a problem in that it is increasingly difficult to take up the film in a good rolled form.

For accomplishing the flatness of a film, it is concurrently required to overcome the above problems caused by the flattening of the film surface.

Under the circumstances, there is proposed a laminated film having different values of surface roughness between its one surface (front surface) and the other surface (back surface), i.e., a laminated film of which one surface is flat and the other surface is rough. This laminated film is advantageously used as a film of which one surface is required to be flat and the other surface may be rough, such as a base film for a magnetic tape. When a magnetic layer is formed on the flat surface of the above film and when the other rough surface is used as a running surface, the above film is excellent as a base film for a magnetic tape, since the magnetic tape can have both flatness for improving electromagnetic conversion characteristics and lubricity for improving film running properties.

In recent years, however, it is required to decrease the roughness of the rough surface, too and the "rough" surface is increasingly flattened as well.

Under the circumstances, the fluctuation of the film surface roughness becomes outstanding as differences in film properties and particularly, the fluctuation of surface roughness in the film width direction comes to cause a difference in take-up properties.

For example, in the production of a magnetic tape, one of products for which a polyester film is used, a large-length polyester film having a large width (e.g., 300 to 1,500 mm) is coated with a magnetic layer and calender-treated to prepare a large-width web film, the treated film is slit, e.g., to a width of 8 mm or ½ inch to prepare tens of slit tapes, and these slit tapes having a length of hundreds to thousands meters are simultaneously taken up to prepare pancake rolls. When the surface roughness of the above large-width base film fluctuates, the running surfaces of the slit tapes have different values of surface roughness.

When the slit tapes are taken up under conditions conforming to slit tapes having a relatively "flat" surface roughness, rolls of slit tapes having a relatively "coarse" surface roughness are liable to have a nonuniform side face due to the higher smoothness or slipperiness thereof. As a result, the rolled forms of the pancake rolls are poor to decrease the yield. When the side face of a pancake roll is too nonuniform, the pancake roll has a broken form and the operation may be stopped.

On the other hand, when the slit tapes are taken up under conditions conforming to slit tapes having a relatively "coarse" surface roughness, slit tapes having a "coarse" surface roughness give pancake rolls having a good rolled form. However, slit tapes having a relatively "flat" surface roughness may give pancake rolls having bumps or having an irregularly circular form or a slightly angular form because of insufficient lubricity. As a result, some pancake rolls have poor rolled forms to decrease the yield of products.

That is, when the surface roughness of a large-width film varies in the width direction, not all the pancake rolls of slit tapes obtained by slitting the large-width film have an excellent rolled form.

Japanese Laid-open Patent Publication No. 126,723/1988 discloses a process for the production of a biaxially oriented film having improved haze uniformity in the width direction, in which an unstretched film having a higher concentration distribution of inert inorganic lubricant particles in sides and a lower concentration distribution in a central area is prepared and biaxially oriented. However, the above publication neither discloses nor suggests the present invention.

SUMMARY OF THE INVENTION

The present inventors have studied the fluctuation of surface roughness in the film width direction, and as a result have found that, when a film is stretched in the width direction by a tenter method, the degree of flatness of the film surface is liable to change from a low flatness in a central portion of the film to a high flatness in side portions even if the film contains lubricants uniformly.

The present inventors have made further studies to decrease or remove the fluctuation of the surface roughness in the film width direction, and as a result have found that, in a laminated film having a surface layer, the surface roughness of the surface layer changes in the width direction of the surface layer depending upon the thickness of the surface layer even if lubricants is contained uniformly.

With the view to the above phenomenon, the present inventors have found that the fluctuation of surface roughness in the film width direction can be decreased by adjusting the thickness of the surface layer in the film width direction with taking into consideration a decrease or increase in the birefringence or orientation angle of the surface layer. On the basis of this finding, the present invention has been completed.

It is therefore an object of the present invention to provide a biaxially oriented, laminated polyester film having a uniform surface roughness in the width direction.

It is another object of the present invention to provide a biaxially oriented, laminated polyester film which is excellent in the property of being taken up in the form of a roll and gives an excellent rolled form.

It is further another object of the present invention to provide a large-width biaxially oriented, laminated polyester film, which gives pancake of a plurality of slit films in the form of rolls free of side surface nonuniformity and free of bumps when the slit films are taken up under uniform conditions.

It is still further another object of the present invention to provide a biaxially oriented, laminated polyester film which can be used as a base film for magnetic recording media for high-density recording, such as a magnetic, high-density recording tape or disk.

According to the present invention, generally, the above objects and advantages of the present invention are achieved by a biaxially oriented, laminated polyester film comprising a polyester substrate layer (A) and a polyester surface layer (B) laminated on at least one surface of the polyester substrate layer (A), the polyester surface layer (B) containing inert particles, having a thickness of 0.02 to 3 μm, having a surface roughness Ra of 3 to 40 nm and having a surface roughness Ra fluctuation ratio of 5% or less when measured along a distance of 500 mm in the film width direction.

The above objects and advantages of the present invention will be apparent from the following detailed description of the invention.

DETAILED DESCRIPTION OF THE INVENTION

The polyester used in the present invention is formed of an acid component which is mainly from an aromatic dicarboxylic acid and a glycol component which is mainly from an aliphatic glycol. The polyester is substantially linear, and has film formability, particularly the capability of forming a film when melt-molded.

The aromatic dicarboxylic acid includes terephthalic acid, naphthalenedicarboxylic acid, isophthalic acid, diphenoxyethanedicarboxylic acid, diphenyldicarboxylic acid, diphenyletherdicarboxylic acid, dlphenylsulfonedicarboxylic acid,. diphenylketonedicarboxylic acid and anthracenedicarboxylic acid.

The glycol includes polymethylene glycols having 2 to 10 carbon atoms such as ethylene glycol, trimethyl glycol: tetramethylene glycol, pentamethylene glycol, hexamethylene glycol and decamethylene glycol, and alicyclic diols such as cyclohexanedimethanol.

In the present invention, the polyester is preferably selected from polyesters containing, as a main recurring unit, either one member of alkylene terephthalate and alkylene naphthalate.

Of the above polyesters, preferred are a polyethylene terephthalate homopolymer, a polyethylene-2,6-naphthalate homopolymer, and a copolymer containing an acid component of which at least 80 mol % is from at least one member of terephthalic acid and 2,6-naphthalenedicarboxylic acid and a glycol component of which at least 80 mol % is from ethylene glycol. In the above polyethylene terephthalate copolymer, less than 20 mol % of the acid component may be from the above aromatic dicarboxylic acids other than terephthalic acid and in the above polyethylene-2,6-naphthalate copolymer, less than mol % of the acid component may be from the above aromatic dicarboxylic acids other than naphthalenedicarboxylic acid. Further, in the above polyethylene terephthalate copolymer or polyethylene-2,6-naphthalate copolymer, less than 20 mol % of the acid component may be from aliphatic dicarboxylic acids such as adipic acid and sebacic acid; and alicyclic dicarboxylic acids such as cyclohexane-1,4-dicarboxylic acid, and less than 20 mol % of the glycol component may be from the above glycols other than ethylene glycol; aromatic diols such as hydroquinone, resorcin and 2,2-bis(4-hydroxyphenyl)propane; aliphatic diols having an aromatic ring such as 1,4-dihydroxydimethylbenzene; and polyalkylene glycols such as polyethylene glycol, polypropylene glycol and polytetramethylene glycol.

The polyester used in the present invention may further contain less than 20 mol %, based on the total amount of components from dicarboxylic acids and hydroxycarboxylic acids, of a component from hydroxycarboxylic acids such as aromatic hydroxy acids such as hydroxybenzoic acid and aliphatic hydroxy acids such as ω-hydroxycaprotc acid.

Further, the polyester used in the present invention may contain a component from a polycarboxylic acid having at least trifunctional groups or a polyhydroxy compound such as trimellitic acid or pentaerythritol in such an amount that the polyester is substantially linear, e.g., in an amount of 2 mol % or less based on the total of acid components.

The above polyester is known per se, and can be produced by a known method.

The biaxially oriented, laminated polyester film of the present invention (to be sometimes abbreviated as "laminated polyester film" hereinafter) comprises a polyester substrate layer (A) and a polyester surface layer (B) laminated on at least one surface of the polyester substrate layer (A). In the biaxially oriented, laminated polyester film of the present invention, there may be an intermediate layer present, for example, between the substrate layer (A) and the polyester surface layer (B) for improving the adhesion between the substrate layer (A) and the polyester surface layer (B). The intermediate layer may be formed of any one of a polyester and other resin. In any case, the surface layer (B) forms an outermost layer, or the surface layers (B) form outermost layers of the laminated polyester film.

The substrate layer (A) and the surface layer (B) may be formed of the same polyester or different polyesters.

In the laminated polyester film of the present invention, the surface layer (B) contains inert particles of at least one kind, as a lubricant.

The above inert particles include silicon dioxide (including hydrate, diatomaceous earth, silica sand and quartz); (2) alumina (including crystals in the form of α, β, γ, δ, θ and χ); (3) silicates containing at least 30% by weight of an $SiO_2$ component (e.g., amorphous or crystalline clay mineral and aluminosilicate (including calcined materials and hydrates), chrysotile, zircon and fly ash)); (4) oxides of Mg, Zn, Zr and Ti; (5) sulfates of Ca and Ba; (6) phosphates of Li, Ba and Ca (including monohydrates and dihydrates); (7) benzoates of Li, Na and K; (8) terephthalates of Ca, Ba, Zn and Mn; (9) titanates of Mg, Ca, Ba, Zn, Cd, Pb, St, Mn, Fe, Co and Ni; (10) chromates of Ba and Pb; (11) carbon (e.g., carbon black and graphite); (12) glass (e.g., glass powder and glass beads); (13) carbonates of Mg; (14) carbonate of Ca; (15) fluorite; (16) ZnS and (17) particles of polymers having high heat resistance (e.g., a silicone resin and crosslinked acrylic particles, crosslinked polystyrene particles, crosslinked polyester particles, Teflon particles, polyimide particles and melamine particles).

The average particle diameter of the inert particles is preferably 0.05 to 3 μm, more preferably 0.08 to 0.9 μm, particularly preferably 0.09 to 0.49 µm. The content of the inert particles in the surface layer is preferably 0.01 to 8% by weight, more preferably 0.1 to 3% by weight, particularly preferably 0.8 to 0.9% by weight.

In the laminated polyester film of the present invention, the surface roughness Ra of the surface layer (B) is 3 to 40 nm, preferably 4 to 85 nm, more preferably 5 to 35 nm, particularly preferably 5 to 25 nm, the most preferably 5 to 15 nm.

When the surface layer (B) is measured for Ra in a range of 500 mm in any area on the surface layer (B) surface, the Ra fluctuation ratio is 5% or less.

The Ra fluctuation ratio of 5% or less means that the largest value of Ra [Ra(Max)] and the smallest value of Ra [Ra(Min)] satisfy the following formula.

$$\frac{Ra(\text{Max}) - Ra(\text{Min})}{\overline{Ra}} \times 100 \leq 5$$

In the above formula, $\overline{Ra}$ stands for an average value of the largest and smallest values.

The Ra fluctuation ratio is preferably 3% or less, more preferably 1% or less.

When the surface roughness Ra and the Ra fluctuation ratio are within the above ranges, a plurality of slit films from the laminated polyester film of the present invention can be taken up under the same conditions to give pancake rolls almost all of which have an excellent rolled form. That is, the laminated polyester film of the present invention can substantially prevent the phenomenon of slit films having bumps due to insufficient lubricity and the phenomenon of pancake rolls forming nonuniform end faces. Naturally, the laminated polyester film which has not yet been slit is also excellent in the property of being taken up in the form of a roll.

The thickness of the surface layer (B) is 0.02 to 3 µm, preferably 0.05 to less than 2.5 µm, more preferably 0.05 to 2 µm, further more preferably 0.07 to 1 µm, particularly preferably 0.2 to 0.45 µm. When the surface layer (B) has a thickness in this range, the thickness of the surface layer (B) is controlled by a method to be described later so that the Ra fluctuation ratio in the above-described range can be easily accomplished.

When the surface layer (B) has too small a thickness, the surface roughness Ra changes to a great extent by a slight change in the thickness of the surface layer (B), and it is difficult to accomplish the Ra fluctuation ratio in the above range. Further, the number of projections formed of inert particles decreases, and the laminated film shows decreased lubricity. On the other hand, when the surface layer (B) has too large a thickness, the changes in the surface roughness Ra depending upon the thickness of the surface layer (B) is too small, and it is difficult to accomplish the Ra fluctuation in the above range.

In the present invention, with an increase in the birefringence (Δn) which is a difference between the refractive index ($n_{MD}$) in the longitudinal direction and the refractive index ($n_{TD}$) in the width direction of the surface layer (B), measured in the film width direction, the thickness of the surface layer (B) increases in the film width direction. By adjusting the thickness of the surface layer (B) as above described, the fluctuation of the surface roughness Ra of the surface layer in the width direction can be decreased.

The degree of adjustment of the thickness of the surface layer (B) in the width direction depending upon the birefringence value cannot uniformly determined, since the adjustment is affected by factors such as the kind of the polyester used as the surface layer, the kind and concentration of inert particles contained in the surface layer (B) and the step of production of the laminated polyester film of the present invention. However, when the above factors are fixed, the relationship among the value of the birefringence, thickness and surface roughness Ra in the surface layer (B) can be determined in advance by experiment, so that the Ra fluctuation ratio in the film width direction in the above range can be easily accomplished by adjusting the thickness of the surface layer (B).

Further, in the laminated polyester film of the present invention, the birefringence and thickness in a position A on the surface layer (B) where the birefringence measured in the film width direction is the smallest, the birefringence and thickness in a position B on the surface layer (B) where the birefringence measured in the film width direction is the largest, and the distance between these two positions preferably satisfy the following relationship (1), $$\frac{\Delta n_B - \Delta n_A}{2D} \times \sqrt{L} \leq \frac{t_B - t_A}{t_A} \leq \frac{20(\Delta n_B - \Delta n_A)}{D} \times \sqrt{L} \quad (1)$$

wherein $t_A$ is a thickness (µm) of the surface layer (B) in the position A, $t_B$ is a thickness (µm) of the surface layer (B) in the position B, $\Delta n_A$ is the birefringence in the position A, $\Delta n_B$ is a birefringence in the position B, L is a distance (m) between the position A and the position B, and D is an average particle diameter (µm) of inert particles contained in the surface layer (B), more preferably satisfy the following relationship (1A), $$\frac{\Delta n_B - \Delta n_A}{D} \times \sqrt{L} \leq \frac{t_B - t_A}{t_A} \leq \frac{10(\Delta n_B - \Delta n_A)}{D} \times \sqrt{L} \quad (1A)$$

particularly preferably satisfy the following relationship (1B), $$\frac{\Delta n_B - \Delta n_A}{0.75D} \times \sqrt{L} \leq \frac{t_B - t_A}{t_A} \leq \frac{5(\Delta n_B - \Delta n_A)}{D} \times \sqrt{L} \quad (1B)$$

and the most preferably satisfy the following relationship (1C)

$$\frac{\Delta n_B - \Delta n_A}{0.5D} \times \sqrt{L} \leq \frac{t_B - t_A}{t_A} \leq \frac{5(\Delta n_B - \Delta n_A)}{D} \times \sqrt{L} \quad (1C)$$

When the above relationship is satisfied, the fluctuation ratio of the surface roughness Ra in the width direction of the surface layer (B) of the laminated polyester film of the present invention can be easily brought into the above range by adjusting the thickness of the surface layer (B).

As described above, the surface layer (B) has the position A where the birefringence is the smallest when measured in the film width direction (at right angles with the film longitudinal direction) and the position B where the birefringence is the largest. The distance L between the position A and the position B is preferably at least 100 mm, more preferably at least 300 mm, particularly preferably at least 600 mm, the most preferably at least 900 mm.

In the laminated polyester film of the present invention, further, the thickness t (µm) in any position on the surface layer (B) and the average particle diameter D (µm) of the inert particles contained in the surface layer (B) preferably satisfy the following relationship (2), $$0.1 \leq t/\sqrt{D} \leq 4 \tag{2}$$

more preferably satisfy the following relationship (2A), $$0.2 \leq t/\sqrt{D} \leq 2 \tag{2A}$$

particularly preferably satisfy the following relationship (2B), $$0.25 \leq t/\sqrt{D} \leq 1 \tag{2B}$$

and the most preferably satisfy the following relationship (2C).

$$0.3 \leq t/\sqrt{D} \leq 0.5 \tag{2C}$$

When the thickness t of the surface layer (B) and the average particle diameter D of the inert particles satisfy the above relationship, the particle diameter of the inert particles and the thickness of the surface layer (B) are well balanced, and the dropping of inert particles off from the surface layer (B) and the occurrence of abrasion dust in the step of producing the laminated film of the present invention can be substantially prevented. At the same time, further, the fluctuation ratio of the surface roughness Ra of the surface layer (B) can be more easily brought into the above range by adjusting the thickness of the surface layer (B).

Further, the average particle diameter D (μm) and the content W (% by weight) of the inert particles contained in the surface layer (B) preferably satisfy the following relationship (3), $$0.01 \leq D \times W \leq 2 \tag{3}$$

more preferably satisfy the following relationship (3A), $$0.02 \leq D \times W \leq 1.4 \tag{3A}$$

particularly preferably satisfy the following relationship (3B), $$0.04 \leq D \times W \leq 0.6 \tag{3B}$$

and the most preferably satisfy the following relationship (3C), $$0.08 \leq D \times W \leq 0.2 \tag{3C}$$

When the average particle diameter D (μm) of the inert particles and the content W (% by weight) of the inert particles contained in the surface layer (B) satisfy the above relationship, the content of the inert particles in the surface layer (B) is proper, the dropping of inert particles off from the surface layer (B) can be substantially prevented, and the laminated polyester film of the present invention can excellently maintain lubricity.

According to another aspect of the present invention, when the laminated polyester film of the present invention has a small width, for example, when it has a width of 2,000 mm or less, the thickness of the surface layer (B) changes such that the thickness of the surface layer (B) increases as the orientation angle increases in the film width direction. In this case, the orientation angle in a position A' on the surface layer (B) where the orientation angle measured in the film width direction is the smallest, the orientation angle in a position B' on the surface layer (B) where the orientation angle measured in the film width direction is the largest, the thickness of the surface layer (B) and the distance between the above two positions preferably satisfy the following relationship (4), $$\frac{\theta_{B'} - \theta_{A'}}{9{,}000} \times L' \leq \frac{t_{B'} - t_{A'}}{t_{A'}} \leq \frac{\theta_{B'} - \theta_{A'}}{0.9} \times L' \tag{4}$$

wherein $t_{A'}$ is a thickness (μm) of the surface layer (B) in the position A', $t_{B'}$ is a thickness (μm) in the position B' on the surface layer, $\theta_{A'}$ is an orientation angle (°) in the position A', $\theta_{B'}$ is an orientation angle (°) in the position B', and L' is a distance (m) between the position A' and the position B'.

The above orientation angle refers to an angle formed by the longitudinal direction (machine direction) of a film and the orientation direction of the film. The orientation direction of the film refers to a vector-composite direction of orientation directions in the longitudinal and width directions, and can be easily found with a polarization microscope.

Although not specially limited, the laminated polyester film of the present invention includes:

(1) a laminated polyester film having a two-layer structure in which a surface layer (B) is formed on one surface of a substrate layer (A), (2) a laminated polyester film having a three-layer structure in which an intermediate layer and a surface layer (B) are formed on one surface of a substrate layer (A) in the order of the intermediate layer and the surface layer (B), (3) a laminated polyester film having a three-layer structure in which a surface layer (B) is formed on one surface of a substrate layer (A) and a surface layer (B) is formed on the other surface of the substrate layer (A), and (4) a laminated polyester film having a three-layer structure in which a surface layer (B) is formed on one surface of a substrate layer (A) and a surface layer different from the surface layer (B) is formed on the other surface of the substrate layer (A).

The layer(s) other than the surface layer (B) may Contain the same inert particles as those contained in the surface layer (B). When the laminated polyester film has a first surface formed of the surface layer (B) and a second surface formed of the substrate layer (A) or a surface layer other than the surface layer (B) (i.e., in the case of a laminated polyester film having one of the above structures (1), (2) and (4)), the inert particles are preferably incorporated such that the surface roughness Ra of the second surface is smaller than the surface roughness Ra of the surface layer (B) by at least 2 nm, particularly by at least 4 mn.

A laminated polyester film having any one of the above structures (1), (2) and (4) can be preferably used as a base film for a magnetic recording tape.

The total thickness of the biaxially oriented, laminated polyester film of the present invention is determined depending upon an end use. Therefore, depending upon the thickness of the above surface layer (B) which thickness is adjusted in the film width direction, the thickness of other layers such as the substrate layer (A), the intermediate layer, etc., may be altered in such a range that the total thickness is maintained.

The total thickness of the biaxially oriented, laminated polyester film is generally 1 to 300 μm, preferably 2 to 80 μm, more preferably 2 to 25 μm, particularly preferably 4 to 17 μm. The thickness of the substrate layer (A) is preferably larger than the thickness of the surface layer (B), and when the intermediate layer is present, its thickness is also preferably larger than the thickness of the surface layer (B).

The biaxially oriented, laminated polyester film of the present invention can be produced by a known method except that the surface layer (B) is imparted with uniform properties in the film width direction. For example, it can be produced by producing a laminated unstretched film first, and then biaxially orienting the unstretched film.

The above laminated unstretched film can be produced by a known method of the production of a conventional laminated film. For example, it can be produced by a method in which a film layer for forming the surface layer (B) and a film layer for forming the substrate layer (A) are laminated in a state in which the polyester(s) is/are melted or solidified by cooling. More specifically, it can be produced by any one of a co-extrusion method and an extrusion laminate method. The co-extrusion method more easily serves to produce the effects of the present invention.

The laminated unstretched film of which the thickness is adjusted in the film width direction can be produced, for example, by a co-extrusion method in which a manifold for producing two layers or three layers is provided and the slit gap is altered in the width direction just before a polymer for the surface layer (B) is combined with polymer(s) for other layer(s). Further, there may be employed other method such as a feed block method.

In the case of a laminated polyester film having a two-layer structure, the surface layer (B) forms one surface of the laminated polyester film and the substrate layer (A) forms the other surface of the laminated polyester film.

The laminated film by the above method can be produced and biaxially oriented according to a known method. For example, polyester(s) is/are melted and co-extruded at a temperature between melting point (Tm: °C.) and (Tm +70)° C. to prepare a laminated unstretched film having an intrinsic viscosity of 0.35 to 0.9 dl/g, the laminated unstretched film is monoaxially (in the longitudinal or width direction) stretched at a stretch ratio of 2.5 to 5.0 at a temperature between (Tg −10)° and (Tg +70)° C. (in which Tg is the glass transition temperature of the polyester) and the monoaxially stretched film is stretched at right angles with the above stretching direction (e.g., in the width direction when the unstretched film has been stretched in the longitudinal direction) at a stretch ratio of 2.5 to 5.0 at a temperature between Tg (°C.) and (Tg +70)° C. In this case, the area stretch ratio is preferably 9 to 22, more preferably 12 to 22. The biaxial stretching may be carried out by any one of simultaneous biaxial stretching and consecutive biaxial stretching methods. Of these methods, preferred is the consecutive biaxial stretching method using a stenter. Since the effects of the present invention can be the most easily produced.

Further, the biaxially oriented laminated film may be heat-set at a temperature between (Tg +70)° C. and Tm (°C.). For example, a polyethylene terephthalate film is preferably heat-set at a temperature between 190° and 240° C. The time required for the heat-setting is, for example, 1 to 60 seconds.

When the apparatus and production conditions for continuously producing a laminated polyester film are determined as described above, the birefringence values in the width direction of the surface layer (B) of the laminated film and positions on the surface layer (B) where the value is the largest and the value is the smallest can be found in advance by simulation and experimentally. And, the gap of an orifice slit through which a molten polyester to form the surface layer (B) is extruded is adjusted on the basis of the above data, whereby there is produced a laminated film having the surface layer (B) having a thickness adjusted on the basis of the values of birefringence and satisfying the above relationship (1).

The laminated polyester film of the present invention is excellently used as a base film for a magnetic recording tape such as a video tape, an audio tape, a computer tape, a floppy disk, and the like.

EXAMPLES

The present invention will be specifically explained hereinafter with reference to Examples.

In Examples, various property values and characteristics were measured and are defined as follows.

(1) Average Particle Diameter of Particles (Area-Circle-Corresponding Diameter)

Measurement of Particles in Film

A sample film was fixed on the sample bed of a scanning electron microscope, and the film surface was ion-etched with a sputtering apparatus (JFC-1100 ion etching apparatus, supplied by Nippon Denshi K. K.) under the following conditions. The sample was placed in a bell jar, the vacuum degree was increased up to about $10^{-3}$ Torr, and the ion etching was carried out at a voltage of 0.25 kV at a current of 12.5 mA for about 10 minutes. Further, gold was sputtered on the film surface with the same apparatus, and the film surface was observed with a scanning electron microscope at a magnification of 10,000 to 30,000, to determine the largest diameters, smallest diameters and area-circle-corresponding diameters of at least 100 particles with Luzex 500 supplied by Nippon Regulators K. K.

(2) Flatness of Film

An Ra (central line average roughness) was measured according to JIS B 0601. A chart (film surface roughness curve) was prepared with a needle-contacting type surface roughness tester (Surfcoder SE-30C, supplied by Kosaka Laboratories Ltd.) with a needle radius of 2 μm under a needle pressure of 30 mg. A portion having a measured length L in the direction of its center line was picked up from the obtained film surface roughness curve. The center line of this picked-up portion was taken as an X axis, the direction of the length multiplication was taken as a Y axis, and the roughness curve was expressed as Y=f(x). The value (Ra; nm) given by the following equation was defined as a film surface roughness.

$$Ra = \frac{1}{L} \int_0^L |f(x)| dx$$

In the present invention, the measurement length was set at 1.0 mm, and the cut-off value was 0.08 mm. Seven sample pieces was measured, and the average of their measurement values excluding the largest and smallest values was taken as Ra.

(3) Orientation Angle

An angle of the machine direction (longitudinal direction) of a film and an orientation axis was measured, and this angle was taken as an orientation angle.

(4) Refractive Index and Birefringence

A film was measured for a refractive index in the longitudinal direction and a refractive index in the width direction with an Abbe refractometer using sodium D ray as a light source and methylene iodide as a mounting liquid. A difference ($n_{MD}-n_{TD}$) between the refractive index ($n_{MD}$) in the longitudinal direction and the refractive index ($n_{TD}$) in the width direction was determined and taken as a birefringence.

(5) Thickness of Layer

The thickness of each layer was obtained by determining the boundary which is distinguished by the differences in the kind and/or the amount of inert particles contained in each layer of a laminated polyester film. The differences were observed from the photographs of cross sections of the film taken with a transmission electron microscope (TEM). Or, the thickness of each layer was determined by measuring and calculating the fluorescence X-ray wave length and intensities which was characterized by the kind and the total amount of inert particles contained in each layer of a laminated polyester film.

(6) Take-up Properties (i) Rolled Form (Take-up Properties A)

A large-width and large-length film having a width of 1,000 mm and a length of 5,000 m or a large-width and large-length film having a width of 500 mm and a length of 9,000 m was taken up in the form of a roll to evaluate the easiness to obtain a roll having an excellent rolled form.

AA: When a film is taken up in the form of a large-width and large-length roll at a rate of 200 m/minute, a roll having an excellent rolled form can be obtained under considerably broad ranges of take-up conditions (tension and contact pressure).

A: When the take-up conditions (tension and contact pressure) are changed while the take-up rate is set at 200 m/minute, creases and bumps (bump-like projections) are liable to occur, and the ranges of take-up conditions are limited. However, under specific conditions, a roll having an excellent rolled form can be obtained.

B: Even when the take-up conditions are variously modified at a take-up rate of 200 m/minute, bumps occur and a roll has a nonuniform side surface. As a result, no roll having an excellent rolled form can be obtained. When the take-up rate is set at 50 m/minute, a roll having nearly good rolled form can be obtained under specific conditions, while the take-up rate is low and industrially disadvantageous.

C: Even when the take-up conditions (tension and contact pressure) are variously modified at a take-up rate of 200 m/minute or 50 m/minute, strong creases and bumps (bump-like projections) occur and a roll has a nonuniform side surface. As a result, no roll having an excellent rolled form can be obtained.

(ii) Rolled Form of Magnetic Tapes (Take-up Properties B)

[Preparation of magnetic tapes]

100 Parts by weight (to be simply referred to as "part" hereinafter) of $\gamma$-$Fe_2O_3$ and the following components were kneaded and dispersed with a ball mill.

| | | |
|---|---|---|
| Polyester polyurethane | 12 | parts |
| Vinyl chloride-vinyl acetate-maleic anhydride copolymer | 10 | parts |
| α-Alumina | 5 | parts |
| Carbon black | 1 | part |
| Butyl acetate | 70 | parts |
| Methyl ethyl ketone | 35 | parts |
| Cyclohexanone | 100 | parts |

Further, the following components were added to the dispersion.

| | | |
|---|---|---|
| Fatty acid: oleic acid | 1 | part |
| Fatty acid: palmitic acid | 1 | part |
| Fatty acid ester (amyl stearate) | 1 | part |

The mixture was kneaded for 10 to 30 minutes. Further, 7 parts of a solution of 25% by weight of a triisocyanate compound in ethyl acetate was added, and the mixture was shear-dispersed at a high rate for 1 hour to prepare a magnetic coating liquid.

The above-prepared coating liquid was applied to a laminated polyester film such that a dry coating had a thickness of 2.5 μm. This magnetic coating was formed on the surface other than the surface layer (B).

Then, the magnetic coating was orientation-treated in a direct current magnetic field, and dried at 100° C. The laminated film coated with the dried magnetic coating was calender-treated and slit to a width of ½ inch to give magnetic tapes.

[Evaluation of rolled magnetic tapes for a yield]

While the above laminated film was slit to a width of ½ inch, the tapes were evaluated for take-up properties. When the magnetic tapes wire prepared, tens of magnetic tapes having a width of ½ inch each were prepared from a large-width rolled film having a width of 300 mm to 1,500 mm, and the rolled forms of the magnetic tapes were evaluated on the basis of the following ratings.

AA: All the tapes are excellently taken up at a take-up rate of 300 m/minute under broad ranges of conditions such as the tension of a slitter.

A: All the tapes are taken up in an excellent rolled form at a take-up rate of 300 m/minute under limited, modified ranges of conditions such as the tension of a slitter. However, all the tapes are excellently taken up at a take-up rate of 100 m/minute under broad ranges of conditions such as the tension of a slitter.

B: Even when the conditions such as the tension of a slitter are changed at a take-up rate of 300 m/minute, not all the tapes were taken up in an excellent rolled form. Some tapes show a side surface nonuniformity of 0.5 mm or less, or some tapes (pancake rolls) show a slight concavoconvex deformation (bumps). These tapes are considered to be usable anyhow. When the take-up rate is set at 100 m/minute under limited ranges of conditions, all the tapes were obtained in an excellent rolled form.

C: Even when the slitter conditions are modified at a take-up rate of 300 m/minute, side face nonuniformity occurs to a great extent, or concavoconvex deformation (bumps, bump-like projections) occurs. Not all the tapes are taken up in an excellent rolled form, and some tapes are not usable (pancake). Even when the slitter conditions are modified at a take-up rate of 100 m/minute, some tapes show a side surface nonuniformity of about 0.5 mm, or some tapes show a slight concavoconvex deformation (bumps).

D: Even when the slitter conditions are modified at a take up rate of 300 m/minute or 100 m/minute, some tapes show a great side surface nonuniformity or a large concavoconvex deformation (bumps), so that no tapes are obtained in an excellent rolled form.

EXAMPLES 1–3 AND COMPARATIVE EXAMPLE 1

Dimethyl terephthalate and ethylene glycol were polymerized in the presence of manganese acetate as an ester exchange catalyst, antimony trioxide as a polymerization catalyst, phosphorous acid as a stabilizer and particles shown in Table 1 as a lubricant, according to a conventional method, to give a polyethylene terephthalate having an intrinsic viscosity (o-chlorophenol, 35° C.) of 0.82 dl/g for a surface layer and a core layer.

Then, the above polyethylene..terephthalate was dried at 170° C. for 3 hours, fed to separate extruders of a co-extrusion film forming machine, and co-extruded through a three-layer die to obtain a laminated unstretched film. For changing the thickness ratio of each layer in the width direction, orifice members of each orifice of the manifold three-layer die had been arranged such that the distance of the orifice members of each orifice was properly adjusted in the width direction. The above-obtained laminated unstretched film had a three-layer structure of a core layer, a surface layer (B) and a layer to which the magnetic coating liquid was to be applied. The laminated unstretched film was consecutively stretched 4.0 times in the longitudinal direction and 3.8 times in the width direction. The stretching in the longitudinal direction was carried out at a low-rate stretching roll temperature of 66° C. and under heat with an IR heater (surface temperature 830° C.). The stretching in the width direction was carried out with a stenter at 97° C. Further, the biaxially oriented film was heat-set at 220° C.

After taken out from the stenter, the biaxially oriented, laminated film had a width of 4.5 m. The film was slit along a center in the width direction and along portions 1,000 mm apart from the center and portions 2,000 mm apart from the center. The slit film having a width of 1,000 mm each were taken up in the form of a roll having a film length of 5,000 m under the same conditions to obtain four film rolls. All the slit films obtained in Examples 1 to 3 showed excellent take-up properties and gave excellent rolled forms. On the other hand, in Comparative Example 1, the slit films on the center side showed excellent take-up properties and excellent rolled forms, while the slit films on the peripheral sides showed insufficient take-up properties and gave poor rolled forms.

A magnetic layer was formed on each of one slit film of the film roll (roll 1) on the center side and one slit film of the film roll (roll 2) on the peripheral side according to the above-described method, and the films coated with the magnetic layer were calender-treated and then slit to a width of ½ inch. The resultant slit tapes were taken up under the same conditions in the form of a pancake roll.

Table 1 shows the properties of these tapes.

A measurement position A or B in Table 1 refers to a position on the surface layer (B) where the film shows the largest or smallest birefringence when measured in the width direction.

EXAMPLE 4 AND COMPARATIVE EXAMPLE 2

A slurry of ethylene glycol containing crosslinked polystyrene was prepared, and the ethylene glycol slurry and dimethyl terephthalate were subjected to an ester exchange reaction in the presence of manganese acetate as an ester exchange catalyst. Then, the reaction product was polycondensed in the presence of antimony trioxide as a polymerization catalyst and phosphorous acid as a stabilizer to obtain a polyethylene terephthlate having an intrinsic viscosity of 0.70dl/g for a surface layer.

Further, a polyethylene terephthalate having an intrinsic viscosity of 0.82 dl/g, which substantially not contained inert particles, was prepared in the same manner as above except that no crosslinked polystyrene was used. This polyethylene terephthalate was for a core layer.

The above polyethylene terephthalates for a surface layer and a core layer were respectively dried under reduced pressure at 180° C. for 3 hours, then fed to separate extruders and extruded through a three-layer die to obtain a laminated unstretched film. For changing the thickness ratio of each layer in the width direction, orifice members of each orifice of the manifold three-layer die had been arranged such that the distance of the orifice members of each orifice was properly adjusted in the width direction.

The laminated unstretched film was consecutively stretched 4.5 times in the longitudinal direction and 3.8 times in the width direction. The stretching in the longitudinal direction was carried out at a low-rate stretching roll temperature of 66° C. and under heat with an IR heater (surface temperature 830° C.). The stretching in the width direction was carried out with a stenter at 100° C. Further, the biaxially oriented film was heat-set at 200° C. for 5 seconds.

After taken out from the stenter, the film had a width of 4.5 m, and it was slit for obtaining four film rolls in the film width direction as the same manner as in Example 1, and each slit film was taken up in the form of a roll having a film width of 1,000 mm and a film length of 5,000 m.

Further, as the same manner as in Example 1, the above magnetic coating liquid was applied to the film of each roll, and the coated films were calender-treated and then slit to a width of ½ inch. Table 1 shows the properties of the slit films.

EXAMPLE 5

Dimethyl terephthalate and ethylene glycol were polymerized in the presence of manganese acetate as an ester exchange catalyst, antimony trioxide as a polymerization catalyst, phosphorous acid as a stabilizer and particles shown in Table 1 as a lubricant, according to a conventional method, to give a polyethylene terephthalate having an intrinsic viscosity of 0.67 dl/g for a surface layer and a polyethylene terephthalate having an intrinsic viscosity of 0.60 dl/g for a core layer.

The above polyethylene terephthalates for a surface layer and a core layer were respectively dried at 170° C. for 3 hours, then fed to separate extruders and extruded through a three-layer die to obtain a laminated unstretched film. For changing the thickness ratio of each layer in the width direction, orifice members of each orifice of the manifold three-layer die had been arranged such that the distance of the orifice members of each orifice was properly adjusted in the width direction.

The laminated unstretched film was consecutively stretched 3.7 times in the longitudinal direction and 3.8 times in the width direction. The stretching in the longitudinal direction was carried out at a low-rate stretching roll temperature of 72° C. and under heat with an IR heater (surface temperature 830° C.). The stretching in the width direction was carried out with a stenter at 102° C. Further, the biaxially oriented film was heat-set at 220° C. for 5 seconds.

After taken out from the stenter, the film had a width of 4.5 m. The film was slit for obtaining four film rolls having a film width of 1,000 mm as the same manner as in Example 1, and each slit film was taken up in the form of a roll having a film width of 1,000 mm and a film length of 5,000 m.

Further, the above magnetic coating liquid was applied to the film of each roll, and the coated films were calender-treated and then slit to a width of ½ inch. Table 1 shows the properties of the slit films. The slit films were taken up in the form of rolls having a film length of 5,000 m. Table 1 shows the properties of the slit films.

EXAMPLE 6

A biaxially oriented laminated film was obtained in the same manner as in Example 5 except that the stretch ratio in the longitudinal direction was changed to 3.4, that the stretch ratio in the width direction was changed to 4.3, that low-rate stretching roll temperature in the stretching in the longitudinal direction was changed to 76° C. and the temperature for stretching in the width direction was changed to 107° C., and that the thickness ratio of the surface layer was adjusted.

Table 1 shows the properties of the obtained film.

to separate extruders of a co-extrusion film forming machine, and extruded through a three-layer die to obtain a laminated unstretched film. For changing the thickness ratio distribution of each layer in the width direction, orifice members of each orifice of the manifold three-layer die had been arranged such that the distance of the orifice members of each orifice was properly adjusted in the width direction.

The laminated unstretched film was consecutively stretched 4.1 times in the longitudinal direction and 3.7 times in the width direction. The stretching in the longitudinal direction was carried out at a low-rate stretching roll

TABLE 1

|  | Example 1 | | Example 2 | | Example 3 | | Comp. Ex. 1 | | Example 4 | | Comp. Ex. 2 | | Example 5 | | Example 6 | |
| --- | --- | --- | --- | --- | --- | --- | --- | --- | --- | --- | --- | --- | --- | --- | --- | --- |
| Film roll | 1 | 2 | 1 | 2 | 1 | 2 | 1 | 2 | 1 | 2 | 1 | 2 | 1 | 2 | 1 | 2 |
| Film width (mm) | 1000 | 1000 | 1000 | 1000 | 1000 | 1000 | 1000 | 1000 | 1000 | 1000 | 1000 | 1000 | 1000 | 1000 | 1000 | 1000 |
| Total film thickness (μm) | 4.8 | 4.8 | 4.6 | 4.6 | 4.8 | 4.8 | 4.8 | 4.8 | 15 | 15 | 15 | 15 | 15 | 15 | 15 | 15 |
| Surface roughness Ra (nm) | | | | | | | | | | | | | | | | |
| Position A | 8.0 | 8.0 | 7.1 | 7.0 | 9.8 | 9.7 | 8.0 | 7.2 | 20.8 | 20.7 | 20.8 | 19.0 | 10.6 | 10.6 | 10.9 | 10.9 |
| Position B | 8.0 | 8.0 | 7.0 | 7.0 | 9.7 | 9.7 | 7.2 | 6.2 | 20.7 | 20.6 | 19.0 | 16.9 | 10.6 | 10.6 | 10.9 | 10.9 |
| Surface layer thickness t (μm) | | | | | | | | | | | | | | | | |
| Position A | 0.15 | 0.18 | 0.07 | 0.08 | 0.21 | 0.23 | 0.15 | 0.15 | 0.30 | 0.35 | 0.30 | 0.30 | 0.23 | 0.25 | 0.27 | 0.29 |
| Position B | 0.18 | 0.21 | 0.08 | 0.10 | 0.23 | 0.26 | 0.15 | 0.15 | 0.35 | 0.42 | 0.30 | 0.30 | 0.25 | 0.28 | 0.29 | 0.31 |
| Birefringence | | | | | | | | | | | | | | | | |
| Position A | 0.010 | 0.016 | 0.010 | 0.016 | 0.010 | 0.016 | 0.010 | 0.016 | 0.032 | 0.040 | 0.032 | 0.040 | −0.003 | 0.004 | −0.042 | −0.039 |
| Position B | 0.016 | 0.024 | 0.016 | 0.024 | 0.016 | 0.024 | 0.016 | 0.024 | 0.040 | 0.052 | 0.040 | 0.052 | 0.004 | 0.012 | −0.039 | −0.036 |
| Surface layer | | | | | | | | | | | | | | | | |
| Particles | silica | silica | silica | silica | SR[2] | SR[2] | silica | silica | C-Pst[1] | C-Pst[1] | C-Pst[1] | C-Pst[1] | SR[2] | SR[2] | SR[2] | SR[2] |
| Average particle diameter (μm) | 0.27 | 0.27 | 0.14 | 0.14 | 0.49 | 0.49 | 0.27 | 0.27 | 0.3 | 0.3 | 0.3 | 0.3 | 0.49 | 0.49 | 0.49 | 0.49 |
| Content (% by weight) | 0.8 | 0.8 | 1.6 | 1.6 | 0.4 | 0.4 | 0.8 | 0.8 | 6 | 6 | 6 | 6 | 0.4 | 0.4 | 0.4 | 0.4 |
| t/√D | | | | | | | | | | | | | | | | |
| Position A | 0.289 | 0.346 | 0.187 | 0.214 | 0.300 | 0.329 | 0.289 | 0.289 | 0.548 | 0.639 | 0.548 | 0.548 | 0.329 | 0.357 | 0.386 | 0.414 |
| Position B | 0.346 | 0.404 | 0.214 | 0.267 | 0.329 | 0.371 | 0.289 | 0.289 | 0.639 | 0.767 | 0.548 | 0.548 | 0.357 | 0.400 | 0.414 | 0.443 |
| D × W | 0.216 | 0.216 | 0.224 | 0.224 | 0.196 | 0.196 | 0.216 | 0.216 | 1.8 | 1.8 | 1.8 | 1.8 | 0.196 | 0.196 | 0.196 | 0.196 |
| Value of left side member of relationship (1) | 0.011 | 0.015 | 0.021 | 0.029 | 0.006 | 0.008 | 0.011 | 0.015 | 0.0133 | 0.02 | 0.0133 | 0.02 | 0.0071 | 0.008 | 0.003 | 0.003 |
| $(t_B - t_A)/t_A$ | 0.200 | 0.167 | 0.143 | 0.25 | 0.095 | 0.174 | 0 | 0 | 0.16 | 0.2 | 0 | 0 | 0.087 | 0.12 | 0.074 | 0.069 |
| Value of right side member of relationship (1) | 0.444 | 0.593 | 0.857 | 1.143 | 0.245 | 0.327 | 0.444 | 0.593 | 0.533 | 0.8 | 0.533 | 0.8 | 0.285 | 0.326 | 0.122 | 0.122 |
| Substrate layer | | | | | | | | | | | | | | | | |
| Particles | silica | silica | silica | silica | silica | silica | silica | silica | — | — | — | — | silica | silica | silica | silica |
| Average particle diameter (μm) | 0.08 | 0.08 | 0.08 | 0.08 | 0.08 | 0.08 | 0.08 | 0.08 | — | — | — | — | 0.08 | 0.08 | 0.08 | 0.08 |
| Content (% by weight) | 0.18 | 0.18 | 1.8 | 1.8 | 0.18 | 0.18 | 0.18 | 0.18 | — | — | — | — | 0.09 | 0.09 | 0.09 | 0.09 |
| Take-up properties A | A | A | A | A | A | A | A | C | A | A | A | C | A | A | A | A |
| Take-up properties B | AA | AA | A | A | A | A | C | C | A | A | C | C | A | A | A | A |

EXAMPLE 7–11

Dimethyl terephthalate and ethylene glycol were polymerized in the presence of manganese acetate as an ester exchange catalyst, antimony trioxide as a polymerization catalyst, phosphorous acid as a stabilizer and particles shown in Table 2 as a lubricant, according to a conventional method, to give a polyethylene terephthalate having an intrinsic viscosity (in o-chlorophenol, at 35° C.) of 0.62 dl/g for a surface layer and a core layer.

The above polyethylene terephthalate for a surface layer and a core layer was dried at 170° C. for 3 hours, then fed temperature of 68° C. and under heat with an IR heater (surface temperature 830° C.). The stretching in the width direction was carried out with a stenter at 97° C.. Further, the biaxially oriented film was heat-set at 220° C.

After taken out from the stenter, the biaxially oriented, laminated film had a width of 1.2 m. The film was slit along a center in the width direction and along portions 500 mm apart from the center. The slit films having a width of 500 mm each were taken up in the form of a roll having a film length of 9,000 m under the same conditions to obtain two film rolls.

A magnetic layer was formed on one of slit films of these film rolls according to the above-described method, and the film coated with the magnetic layer was calender-treated and then slit to a width of ½ inch. The resultant slit tapes were taken up under the same conditions.

Table 2 shows the properties of these tapes.

TABLE 2

|  | Example 7 | Example 8 | Example 9 | Example 10 | Example 11 |
|---|---|---|---|---|---|
| Film width (m) | 500 | 500 | 500 | 500 | 500 |
| Total film thickness μm) | 10 | 10 | 10 | 10 | 10 |
| Surface roughness Ra (na) | | | | | |
| Position A | 11.0 | 9.0 | 10.0 | 12.9 | 12.4 |
| Position B | 11.0 | 9.0 | 10.0 | 12.9 | 12.4 |
| Surface layer thickness t (μm) | | | | | |
| Position A | 0.50 | 0.30 | 0.50 | 0.70 | 1.2 |
| Position B | 0.57 | 0.37 | 0.58 | 0.81 | 1.32 |
| Birefringence | | | | | |
| Position A | 0.222 | 0.222 | 0.222 | 0.222 | 0.022 |
| Position B | 0.034 | 0.034 | 0.034 | 0.034 | 0.034 |
| Orientation angle (°) | | | | | |
| Position A | 0 | 0 | 0 | 0 | 0 |
| Position B | 11 | 11 | 11 | 11 | 11 |
| Surface layer | | | | | |
| Particles | kaolin | silica | CaI[3] | SR[2] | SR[2] |
| Average particle diameter (μm) | 0.8 | 0.6 | 0.9 | 0.6 | 1.5 |
| Content (% by weight) | 0.2 | 0.18 | 0.2 | 0.6 | 0.08 |
| t/√D | | | | | |
| Position A | 0.559 | 0.387 | 0.506 | 0.904 | 0.980 |
| Position B | 0.704 | 0.581 | 0.632 | 1.046 | 1.078 |
| D × W | 0.16 | 0.108 | 0.18 | 0.36 | 0.12 |
| Value of left side member of relationship (1) | 0.0053 | 0.0071 | 0.0047 | 0.0071 | 0.0028 |
| $(t_B - t_A)/t_A$ | 0.140 | 0.233 | 0.160 | 0.157 | 0.10 |
| Value of right side member of relationship (1) | 0.2121 | 0.283 | 0.189 | 0.283 | 0.113 |
| Substrate layer | | | | | |
| Particles | silica | silica | silica | silica | silica |
| Average particle diameter (μm) | 0.1 | 0.1 | 0.1 | 0.1 | 0.1 |
| Content (% by weight) | 0.2 | 0.2 | 0.2 | 0.2 | 0.2 |
| Take-up properties A | AA | A | AA | A | A |
| Take-up properties B | AA | A | A | A | A |

In Tables 1 and 2,
Comp. Ex.=Comparative Example
C-Pst[1]=crosslinked polystyrene
SR[2]=silicone resin
CaI[3]=calcium carbonate
What is claimed is:

1. A biaxially oriented, laminated polyester film comprising a polyester substrate layer (A) and a polyester surface layer (B) laminated on at least one surface of the polyester substrate layer (A), the polyester surface layer (B) containing inert particles, having a thickness of 0.02 to 3 μm, having a surface roughness Ra of 3 to 40 nm and having a surface roughness Ra fluctuation ratio of 5% or less when measured along a distance of 500 mm in the film width direction, said laminated polyester film having a thicker surface layer at the edges and a thinner surface layer at the center;

wherein the surface layer (B) has a thickness which is increased in the film width direction with an increase in the birefringence, Δn, which is the difference between the refractive index, $n_{MD}$, in the longitudinal direction and the refractive index, $n_{TD}$, in the width direction of the surface layer (B); and wherein the thickness of the surface layer (B) and the birefringence at a position A on the surface layer (B), the thickness of the surface layer (B) and the birefringence at a position S on the surface layer (B), and a distance between these two positions satisfy the following relationship (1)

$$\frac{\Delta n_B - \Delta n_A}{2D} \times \sqrt{L} \leq \frac{t_B - t_A}{t_A} \leq \frac{20(\Delta n_B - \Delta n_A)}{D} \times \sqrt{L} \quad (1)$$

wherein

A is the position along the film width direction with the maximum birefringence value for the film, S is the position along the film width direction having the minimum birefringence value for the film, $t_A$ is the thickness, in μm, of the surface layer (B) at the position A, $t_B$ is the thickness, in μm, of the surface layer (B) at the position S, $\Delta n_A$ is the birefringence at the position A, $\Delta n_B$ is the birefringence at the position S, L is the distance, in meters, between the position A and the position S, and D is the average particle diameter, in μm, of inert particles contained in the surface layer (B); and wherein the thickness of the surface layer (B), at any position of the surface layer (B), the average particle diameter of the inert particles contained in the surface layer (B) and the content of the inert particles contained in the surface layer (B) satisfy the following relations (2) and (3)

$$0.1 \leq t/D \leq 4 \quad (2)$$

$$0.01 \leq D \times W \leq 2 \quad (3)$$

wherein t is the thickness, in μm, of the surface layer (B),

D is the average particle diameter, in μm, of the inert particles contained in the surface layer (B), and W is the content, in % by weight, of the inert particles contained in the surface layer (B); and wherein the orientation angle at a position A' on the surface (B), the orientation angle at a position S' on the surface layer (B), the thickness of the surface layer (B) at the position A', the thickness of the surface layer (B) at the position S' and the distance between the positions A' and S' satisfy the following relationship (4)

$$\frac{\Theta_{B'} - \Theta_{A'}}{9,000} \times L' \leq \frac{t_{B'} - t_{A'}}{t_{A'}} \leq \frac{\Theta_{B'} - \Theta_{A'}}{0.9} \times L' \quad (4)$$

wherein

A' is the position along the film width direction with the minimum orientation angle value for the film, S' is the position along the film width direction with the maximum orientation angle value for the film, $t_{A'}$ is the thickness, in μm, of the surface layer (B) at the position A', $t_{B'}$ is the thickness, in μm, of the surface layer (B) at the position S', $\Theta_{A'}$ is the orientation angle, in degrees, at the position $\Theta_{B'}$ is the orientation angle, in degrees, at the position S', and L' is the distance, in meters, between the position A' and the position S'.

2. the biaxially oriented, laminated polyester film according to claim 1, wherein the film is a base film for a magnetic recording tape.

* * * * *